(12) United States Patent
Saxton et al.

(10) Patent No.: US 9,944,302 B1
(45) Date of Patent: Apr. 17, 2018

(54) HANDBRAKE OPERATING LINKAGE FOR RAILROAD TANK CAR

(71) Applicant: Gunderson LLC, Portland, OR (US)

(72) Inventors: Gregory J. Saxton, Portland, OR (US); Kristofer M. Heitmeyer, West Linn, OR (US)

(73) Assignee: Gunderson LLC, Portland, OR (US)

( * ) Notice: Subject to any disclaimer, the term of this patent is extended or adjusted under 35 U.S.C. 154(b) by 0 days.

(21) Appl. No.: 15/347,430

(22) Filed: Nov. 9, 2016

Related U.S. Application Data

(60) Provisional application No. 62/407,892, filed on Oct. 13, 2016.

(51) Int. Cl.
*B61H 13/02* (2006.01)
*B60T 7/10* (2006.01)

(52) U.S. Cl.
CPC .............. *B61H 13/02* (2013.01); *B60T 7/10* (2013.01); *B60T 7/108* (2013.01)

(58) Field of Classification Search
CPC ........ B61H 13/02; B61H 13/24; B61H 13/20; B61H 1/00; B60T 7/10; B60T 7/108
USPC ............... 188/33, 34, 43, 45, 54, 56, 57, 47
See application file for complete search history.

(56) References Cited

U.S. PATENT DOCUMENTS

| | | | | |
|---|---|---|---|---|
| 1,738,485 A | * | 12/1929 | Sauvage | B61H 13/02 188/33 |
| 1,929,767 A | * | 10/1933 | Baselt | B61H 13/24 188/33 |
| 2,762,459 A | * | 9/1956 | Flowers | B61H 1/00 188/46 |
| 3,517,786 A | * | 6/1970 | Adler | B61H 13/24 188/196 B |
| 4,346,790 A | * | 8/1982 | Morrison | B61F 3/12 105/4.4 |
| 4,422,532 A | * | 12/1983 | Cordani | B61H 13/02 188/47 |
| 4,479,567 A | * | 10/1984 | Pearson | B61H 1/00 188/199 |
| 4,508,197 A | * | 4/1985 | Biegel | B61H 1/00 188/198 |
| 4,805,743 A | * | 2/1989 | Rains | B61D 3/14 188/107 |
| 4,905,795 A | * | 3/1990 | Rains | B61D 3/14 188/107 |
| RE34,040 E | * | 8/1992 | Rains | B61D 3/14 188/107 |

(Continued)

FOREIGN PATENT DOCUMENTS

GB 1160795 A * 8/1969 ............ B61H 13/20

*Primary Examiner* — Thomas W Irvin
(74) *Attorney, Agent, or Firm* — Chernoff, Vilhauer, McClung & Stenzel, LLP

(57) ABSTRACT

A handbrake operating linkage for a railroad tank car, in which a hand wheel used to provide tension in the linkage is located on a lateral side of the car body, near an end of the car and at a height permitting a person standing on the ground alongside the tank car to set the handbrake. The hand wheel is located on the car at an end of the car opposite the end at which an airbrake cylinder-and-piston assembly is located, and the linkage extends from an airbrake cylinder lever to the hand wheel by way of a direction-reversing lever and a bell crank, avoiding a requirement for parts of the linkage to pass through direction-changing sheave wheels.

11 Claims, 2 Drawing Sheets

(56) References Cited

U.S. PATENT DOCUMENTS

| | | | | |
|---|---|---|---|---|
| 5,279,395 A * | 1/1994 | Willis | ............... | B61H 13/02 |
| | | | | 188/198 |
| 7,896,140 B2 * | 3/2011 | Heitmeyer | ............ | B60T 11/04 |
| | | | | 188/52 |
| 2008/0202869 A1 * | 8/2008 | Heitmeyer | ............ | B60T 11/04 |
| | | | | 188/52 |

\* cited by examiner

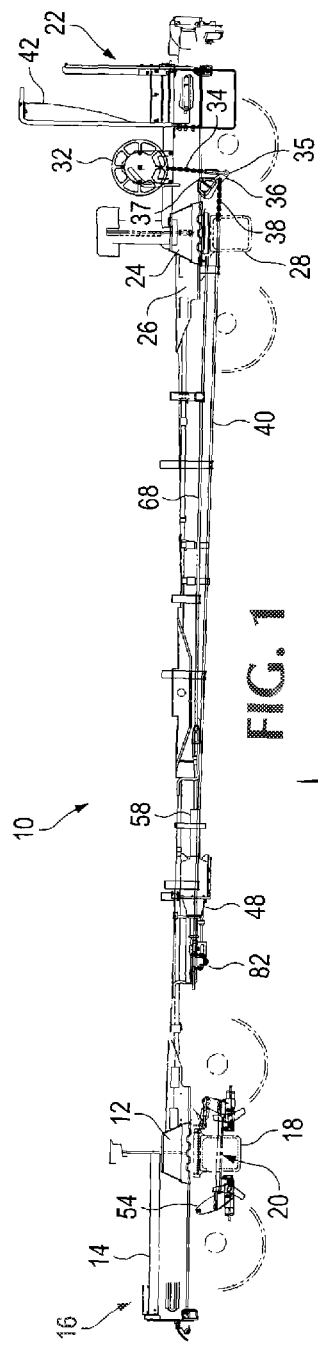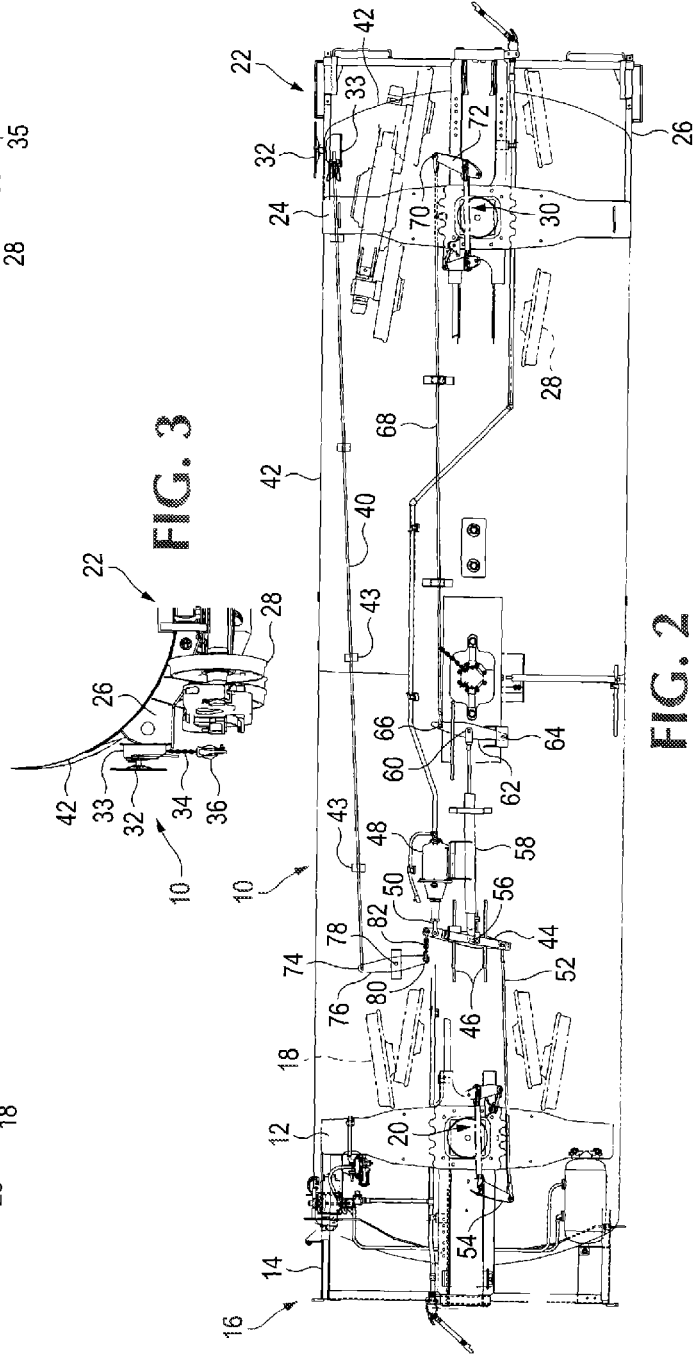

9,944,302 B1

HANDBRAKE OPERATING LINKAGE FOR RAILROAD TANK CAR

BACKGROUND OF THE INVENTION

The present invention relates to railroad tank cars, and in particular to a handbrake arrangement for a railroad tank car.

Most railroad tank cars have handbrake arrangements that allow brakes to be set on both trucks by operation of a handwheel located at an end platform on the tank car. Conventional arrangements, however, require a person to climb onto the end of the tank car to operate the handbrake, and there is a resulting risk of injury.

In a conventional handbrake linkage a chain, or a combination of a chain and tension-carrying rods, extends from a lever normally operated by a pneumatic cylinder-and-piston assembly that is part of an airbrake system to a winch operated by the handwheel located on the end platform at the end of the tank car nearer to the airbrake cylinder-and-piston assembly. The chain conventionally extends through three or more sheave blocks, however, in order to avoid interference with the wheeled truck, as the chain extends to the handbrake winch, with the result that a significant amount of friction opposes take-up of the handbrake-operating chain and thus adds difficulty to the process of setting the handbrake effectively.

In order to reduce or eliminate the risk of injury to personnel and also to facilitate having handbrakes reliably set, it is desired to have a handbrake arrangement that enables brakes to be set on both trucks of a railroad tank car without the necessity for a person to climb up onto the car and with a reduced amount of friction opposing the setting of the handbrake.

SUMMARY OF THE INVENTION

Disclosed herein and shown in the accompanying drawings is a handbrake operating linkage for a railroad tank car, in which a handwheel is located near an end of the car, at a lateral side of the undercarriage and at a low enough height to permit a handbrake to be set reliably by a person standing on the ground alongside the car.

In an embodiment of the handbrake operating linkage disclosed herein, a conventional handwheel is used to apply tension to a linkage arranged to operate the brake-operating live levers on the trucks supporting the ends of the tank car. The linkage, however, is unlike previously-known handbrake linkages in that it utilizes a handwheel located at an end of the tank car, to provide tension in the handbrake linkage to move a lever located near an opposite end of the tank car, where an airbrake cylinder-and-piston arrangement is located.

In such a handbrake operating linkage, the handbrake handwheel may be located on a lateral side of the undercarriage of the tank car, rather than facing outward longitudinally at the end of the car.

The foregoing and other features of the invention will be more readily understood upon consideration of the following detailed description of the invention taken in conjunction with the accompanying drawings.

BRIEF DESCRIPTION OF THE SEVERAL DRAWINGS

FIG. 1 is a side elevational view of portions of a railroad tank car, including the undercarriage of the car and including an embodiment of the handbrake operating linkage disclosed herein.

FIG. 2 is a bottom plan view of the tank car shown in FIG. 1.

FIG. 3 is a perspective view of a portion of the car shown in FIGS. 1 and 2, taken from the right end of FIG. 1, and showing a portion of the handbrake operating linkage incorporated in the car.

DETAILED DESCRIPTION OF PREFERRED EMBODIMENTS

Figure 4:
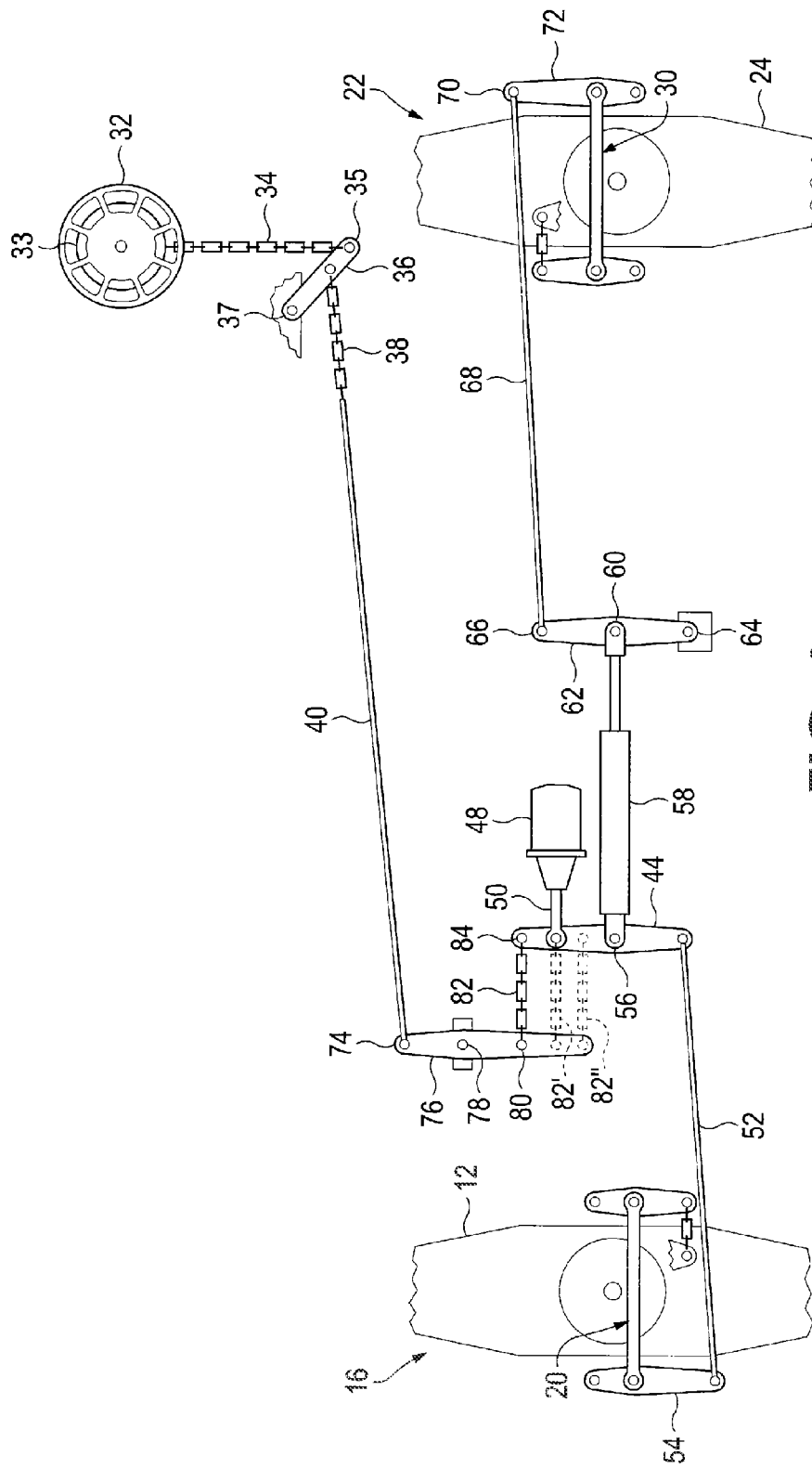
FIG. 4 is a simplified schematic diagram of the handbrake operating linkage incorporated in the car shown in FIGS. 1-3.

Referring now to the drawings that form a part of the disclosure herein, underframe portions of a tank car 10 embodying the handbrake operating linkage disclosed herein are shown in FIGS. 1-3. The tank car 10 has a body bolster 12 and a side sill 14 at a first or "A" end 16, where a wheeled truck 18 includes a brake assembly 20. At the opposite, second, or "B" end 22 of the car 10 are a body bolster 24 and a side sill 26, supported by a wheeled truck 28 that includes a brake assembly 30.

A handbrake-operating handwheel 32 is mounted on a lateral side of the side sill 26 at the "B" end 22, and a tension-bearing member, such as a chain 34, is connected with a winch 33 operated by the handwheel 32 so that the chain 34 can be reeled in and placed into tension. The chain 34 extends downward and has a lower end attached to a direction-changing device, such as an outer, lower, end 35 of a bell crank 36 mounted on the bottom of the side sill 26 and movable in a longitudinal, vertical plane about a transversely-oriented horizontal pivot axis 37.

A tension-bearing linkage includes a short connecting chain 38 that has an outer end that is also connected to the bell crank 36, and the chain 38 extends longitudinally with respect to the car 10 toward the "A" end 16. The chain 38 has an opposite end connected to a further extension of the tension-bearing linkage, that may be a brake-applying, or handbrake, rod 40 that extends toward the "A" end of the car 10. It will be understood that while the chain 38 could be extended instead of incorporating the brake-applying rod 40 in the linkage, there are advantages to use of a rod such as a lighter weight, the absence of a need to avoid tension caused by the weight of sagging chain, and less friction than would be generated by a chain.

Referring now particularly to FIG. 2, a bottom plan view of the car 10, a brake-operating linkage of the car 10 is suspended from the tank 42, which is a structural longitudinal member of the car. The tank 42 is attached to and extends longitudinally between the body bolsters 12 and 24, and the brake-operating linkage and other mechanisms not connected with the present invention are attached to the underside of the tank 42 by suitable brackets 43 which need not be described herein in detail.

The brake-operating linkage includes a cylinder lever 44 supported on a pair of rails 46 on which the cylinder lever 44 is free to slide. A brake operating motor such as an airbrake cylinder-and-piston assembly 48 is suspended from the bottom of the tank 42 and includes a piston rod 50 connected with the cylinder lever 44 through a clevis or the like, so that it can push the cylinder lever 44 toward the "A" end 16 of the tank car 10 to activate the brake assemblies 20 and 30 on the trucks 18 and 28. The piston rod 50 of the cylinder-and-piston assembly 48 is connected with the cylinder lever 44 near one of its opposite ends.

A brake rod 52 is connected with the opposite end of the cylinder lever 44 and extends toward a truck brake operating lever, known as a live lever 54 of the truck brake mechanism 20 of the truck 18 at the "A" end of the tank car 10. Attached to the cylinder lever 44 at a position intermediate the ends of the cylinder lever, and thus between the point of attachment of the piston rod 50 and the point of attachment of the brake rod 52, is one end 56 of a slack adjustment mechanism 58. The slack adjustment mechanism 58 extends toward the "B" end of the car 10 and is connected at its opposite end 60 to an intermediate lever 62, commonly called a horizontal lever, which extends generally transversely of the tank car 10. One end 64 of the horizontal lever is attached pivotably to the underside of the tank 42 through a suitable bracket.

At an opposite end 66 of the horizontal lever 62, a second brake rod 68 is connected to the horizontal lever 62, as through a suitable clevis arrangement. The second brake rod 68 extends toward the "B" end 22 of the car 10, supported by suitable brackets mounted on the bottom of the tank 42. An outer end 70 of the second brake rod 68 is attached, as through a suitable clevis arrangement, to the truck brake operating lever, or live lever 72, of the truck brake assembly 30 of the "B" end truck 28.

In normal airbrake operation of the brakes of the tank car 10, as the piston rod 50 of the pneumatic cylinder-and-piston assembly 48 extends, it pushes the end of the cylinder lever 44 to which the piston rod 50 is connected toward the "A" end 16 of the tank car 10, placing the slack adjuster 58 and the brake rods 52 and 68 in tension and thereby pulling the live levers 54 and 72 of the truck brake assemblies 20 and 30 and applying the friction material of the brakes to the wheels of the trucks 18 and 28.

For manual, that is, handbrake, application of the brakes of the tank car 10, as when, for example, the tank car 10 is parked and not connected to a source of airbrake pressure, the handbrake linkage disclosed above and in the accompanying drawings can be used to set the brakes of both of the trucks 18 and 28. A person standing on the ground alongside the "B" end 22 of the tank car 10 can use the handwheel 32 to take up the chain 34, raising the outer end 35 of the bell crank 36. This movement of the bell crank 36 pulls on the short chain 38, and thus pulls the brake-applying rod 40 toward the "B" end of the tank car 10.

The opposite end of the brake-applying rod 40 is connected, as through a suitable clevis, to a first one 74 of a pair of opposite ends of a direction-reversing lever 76 that is mounted on a suitable bracket attached to the bottom of the tank 42 a short distance away from the cylinder lever 44. The direction-reversing lever 76 has a centrally-located fulcrum 78, and the other one 80 of the pair of opposite ends of the direction-reversing lever 76 is connected, through a tension-bearing member such as a short chain 82, to the cylinder lever 44. The tension-bearing member may be attached to the cylinder lever 44 at a point of attachment 84, or at another location as shown in broken line illustration of chains 82' and 82", so long as the attachment of the brake rod 68 or a slack adjuster 58 connected functionally to the brake rod 68 is between the point of attachment of the brake rod 52 and the point of attachment 84 of the chain 82.

Winding in and shortening the chain 34 by operation of the handwheel 32, thereby moving the bell crank 36 and developing tension in the chain 38 extending between the bell crank 36 and the brake-applying rod 40 pulls the brake-applying rod 40. This tension pulls the first end 74 of the direction-reversing lever 76, pivoting the lever 76 about its fulcrum 78 and thus tightening the chain 82 and moving the end of the cylinder lever 44 in the same direction as if the cylinder lever 44 had been pushed by the piston rod 50 of the airbrake cylinder and piston assembly 48. This also results in pulling the brake rods 52 and 68 and thus pulling the live levers 54 and 72 of the brake assemblies 20 and 30 of the trucks 18 and 28 and applying the brakes in the same way as when the airbrake cylinder and piston assembly pushes the cylinder lever.

The handbrake mechanism described above thus permits the brakes to be set manually on both trucks of the tank car 10 by a person standing on the ground alongside the car and without the necessity to climb onto an end platform of the car as in the previously known handbrake operating mechanisms for tank cars.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A handbrake operating linkage for a railroad tank car having an elongate car body, the handbrake operating linkage comprising:
   (a) a cylinder lever having a pair of opposite ends;
   (b) a first brake rod connected to the cylinder lever at a first attachment point located near a first one of the opposite ends of the cylinder lever, the first brake rod extending to a live lever of a respective truck brake mechanism on a wheeled truck at a first end of the tank car;
   (c) a second brake rod functionally but indirectly connected to the cylinder lever at a second attachment point on the cylinder lever at a location spaced apart from the first attachment point in a direction toward the other one of the opposite ends of the cylinder lever, the second brake rod extending to a live lever of a respective truck brake mechanism on a wheeled truck at a second end of the tank car;
   (d) a reversing lever having a pair of opposite ends, the reversing lever being movable about a fulcrum mounted on the tank car, a first end of the reversing lever on a first side of the fulcrum being connected to the cylinder lever by a respective tension-bearing member acting on the cylinder lever at a third attachment point located on the cylinder lever and spaced apart from the first attachment point in the same direction along the cylinder lever as the second attachment point, the third attachment point being farther than the second attachment point from the first attachment point;
   (e) a brake-applying tension-bearing linkage connected to a second end of the reversing lever, located on an opposite second side of the fulcrum, the brake-applying tension-bearing linkage extending generally longitudinally along the car body toward the second end of the car and being connected to a direction-changing device mounted on a portion of an undercarriage of the tank car on a lateral side of the car at the second end of the car; and
   (f) a flexible tension-bearing member connected to the direction-changing device and extending from the direction-changing device to a tension-generating take-up device, the flexible tension-bearing member being interconnected with the direction-changing device so as to cause the direction-changing device to apply tension to the brake-applying tension-bearing linkage in response to tension created in the flexible tension-bearing member by actuation of the tension-generating take-up device.

2. The handbrake operating linkage of claim 1 including a brake operating motor connected to the cylinder lever near the first one of the opposite ends of the cylinder lever.

3. The handbrake operating linkage of claim 1 including an intermediate lever mounted on the car body and a slack adjustment mechanism interconnected with and extending between the cylinder lever and the intermediate lever, and wherein the second brake rod has a first end that is connected to the intermediate lever.

4. The handbrake operating linkage of claim 1 wherein the direction-changing device is a bell crank mounted on the tank car at the second end of the tank car.

5. The handbrake operating linkage of claim 1 wherein the tension-generating take-up device includes a winch and a handwheel arranged to drive the winch.

6. The handbrake operating linkage of claim 1 including a slack adjuster as part of an indirect connection between the second brake rod and the second attachment point on the cylinder lever.

7. The handbrake operating linkage of claim 6 wherein the slack adjuster extends from the cylinder lever to an intermediate lever attached pivotably to the tank car and wherein the second brake rod is also connected to the intermediate lever and extends from the intermediate lever toward the live lever of the truck brake mechanism of the wheeled truck at the second end of the tank car.

8. The handbrake operating linkage of claim 1 wherein the brake-applying tension-bearing linkage includes a brake-applying rod having a first end interconnected with the reversing lever and an opposite second end connected with the direction-changing device through a flexible chain.

9. The handbrake operating linkage of claim 2 wherein the brake operating motor is an airbrake cylinder-and-piston assembly mounted on the tank car, the cylinder-and-piston assembly including a piston rod having an end connected to the cylinder lever.

10. The handbrake operating linkage of claim 4 wherein the flexible tension-bearing member extending from the bell crank to the tension-generating take-up device is a chain, and wherein the tension-generating take-up device includes a winch and a handwheel arranged to drive the winch.

11. The handbrake operating linkage of claim 4 wherein the bell crank is mounted on a side sill of the tank car and is movable in a longitudinal, vertical plane, about a transversely-oriented horizontal pivot axis.

\* \* \* \* \*